US009614556B2

(12) United States Patent
Morgan et al.

(10) Patent No.: US 9,614,556 B2
(45) Date of Patent: *Apr. 4, 2017

(54) METHOD AND CIRCUITRY FOR TRANSMITTING DATA

(71) Applicant: Texas Instruments Incorporated, Dallas, TX (US)

(72) Inventors: Mark W. Morgan, Allen, TX (US); Swaminathan Sankaran, Allen, TX (US); Bradley Allen Kramer, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,872

(22) Filed: Oct. 30, 2015

(65) Prior Publication Data

US 2016/0056849 A1 Feb. 25, 2016

Related U.S. Application Data

(63) Continuation of application No. 14/290,610, filed on May 29, 2014, now Pat. No. 9,209,842.

(60) Provisional application No. 61/875,320, filed on Sep. 9, 2013.

(51) Int. Cl.
*H04B 1/04* (2006.01)
*H04M 11/06* (2006.01)

(52) U.S. Cl.
CPC .......... *H04B 1/0475* (2013.01); *H04B 1/0483* (2013.01); *H04M 11/066* (2013.01)

(58) Field of Classification Search
CPC .......... H04B 1/38; H04B 1/40; H04B 5/0075; H04L 25/0264; H04L 12/2898; H04L 25/0266
USPC ................. 375/211, 219–220, 257–258, 296
See application file for complete search history.

(56) References Cited

U.S. PATENT DOCUMENTS

| 3,903,507 | A  | 9/1975  | Dillingham      |
|-----------|----|---------|-----------------|
| 5,384,808 | A  | 1/1995  | Van Brunt et al.|
| 5,708,684 | A  | 1/1998  | Ueda            |
| 5,848,150 | A  | 12/1998 | Bingel          |
| 6,483,847 | B1 | 11/2002 | Ross            |
| 6,618,176 | B2 | 9/2003  | Alexander et al.|
| 6,922,080 | B2 | 7/2005  | Haigh et al.    |
| 7,088,803 | B2 | 8/2006  | Rahamim et al.  |
| 7,154,940 | B2 | 12/2006 | Scott et al.    |
| 7,170,908 | B2 | 1/2007  | Chow et al.     |
| 7,200,176 | B1 | 4/2007  | Paulos et al.   |

(Continued)

*Primary Examiner* — Emmanuel Bayard
(74) *Attorney, Agent, or Firm* — Daniel Chan; Charles A. Brill; Frank D. Cimino

(57) ABSTRACT

Data transfer devices and methods for transferring data between first and second circuits are disclosed. A data transfer device includes a first circuit having a plurality of data channels, wherein at least one of the data channels is an active data channel. A serializer has a plurality of inputs and an output, wherein the inputs are coupled to the plurality of data channels. The serializer is for coupling only one active channel at a time to the output. An isolation barrier is coupled to the output of the serializer, the isolation attenuates transients and passes the fundamental frequency. A second circuit includes a deserializer having an input and at least one output, the input is coupled to the isolation barrier, the at least one output is at least one active data channel.

20 Claims, 2 Drawing Sheets

(56) References Cited

U.S. PATENT DOCUMENTS

| | | |
|---|---|---|
| 7,233,600 B1 | 6/2007 | Chau et al. |
| 7,304,909 B2 | 12/2007 | Wallner et al. |
| 7,345,989 B2 * | 3/2008 | Sadri ............... H04L 5/0046 370/203 |
| 7,372,381 B2 | 5/2008 | Chan |
| 7,372,914 B2 | 5/2008 | Calvin |
| 7,519,297 B2 | 4/2009 | Hahin et al. |
| 7,577,223 B2 | 8/2009 | Alfano et al. |
| 7,593,457 B2 * | 9/2009 | Amirichimeh ......... H03K 5/135 375/219 |
| 7,600,162 B2 | 10/2009 | Nishizawa |
| 7,644,207 B2 | 1/2010 | Castro et al. |
| 7,737,871 B2 | 6/2010 | Leung et al. |
| 7,738,568 B2 | 6/2010 | Alfano et al. |
| 7,821,428 B2 | 10/2010 | Leung et al. |
| 7,864,757 B2 | 1/2011 | Hall et al. |
| 7,903,010 B1 | 3/2011 | Melanson |
| 7,936,830 B2 | 5/2011 | Hershbarger |
| 8,049,573 B2 | 11/2011 | Alfano et al. |
| 8,095,710 B2 | 1/2012 | Landry et al. |
| 8,111,761 B2 | 2/2012 | Hershbarger |
| 8,175,172 B2 | 5/2012 | Yamamoto |
| 8,265,174 B2 | 9/2012 | Fukahori et al. |
| 8,300,636 B2 | 10/2012 | Khan |
| 8,340,006 B2 | 12/2012 | Yu et al. |
| 8,502,584 B1 | 8/2013 | Dong et al. |
| 8,571,059 B1 | 10/2013 | Zaliznyak et al. |
| 8,606,184 B1 | 12/2013 | Luthra |
| 8,621,255 B2 * | 12/2013 | Wang ............... G06F 1/3203 375/354 |
| 8,660,489 B2 | 2/2014 | Barrenscheen et al. |
| 8,867,925 B2 | 10/2014 | Zhou et al. |
| 9,043,623 B2 | 5/2015 | Martin et al. |
| 9,209,842 B2 * | 12/2015 | Morgan ............... H04B 1/0475 |
| 2006/0129703 A1 | 6/2006 | Oshikawa et al. |
| 2007/0014371 A1 | 1/2007 | Fukahori et al. |
| 2008/0181316 A1 | 7/2008 | Crawley et al. |
| 2008/0267212 A1 | 10/2008 | Crawley et al. |
| 2010/0036211 A1 | 2/2010 | La Rue et al. |
| 2010/0046641 A1 | 2/2010 | Wala |
| 2010/0201188 A1 | 8/2010 | Robbins |
| 2012/0082448 A1 | 4/2012 | Bouda et al. |
| 2013/0216235 A1 | 8/2013 | Ishida et al. |
| 2014/0313784 A1 | 10/2014 | Strzalkowski |
| 2014/0328427 A1 * | 11/2014 | Chang ............... H04L 27/10 375/271 |
| 2014/0337645 A1 | 11/2014 | Ware et al. |
| 2014/0365835 A1 | 12/2014 | Hu et al. |

\* cited by examiner

METHOD AND CIRCUITRY FOR TRANSMITTING DATA

CROSS-REFERENCE TO RELATED APPLICATION

Under 35 U.S.C. §§119(e), 120, this continuation application claims priority to, and benefits of, U.S. patent application Ser. No. 14/290,610, filed on May 29, 2014, which also claims priority to U.S. Provisional Patent Application Ser. No. 61/875,320, filed Sep. 9, 2013. The entirety of the parent applications is hereby incorporated herein by reference.

BACKGROUND

Some data transmissions are required to go between isolated circuits. For examples, sensors on some circuits operate at high voltage while processors that process data generated by the sensors operate at low voltage. Transients generated on the circuits have a probability of interrupting or corrupting data transmitted between the circuits. In order to overcome the data transmission problems caused by transients, isolation barriers are coupled between the circuits. In some embodiments, the isolation barriers are capacitors that attenuate the frequencies associated with the transients.

One of the problems with transmitting data between high and low voltage circuits is that isolation barriers are required for all of the data channels. When a plurality of channels is required, the same number of expensive isolation barriers is also required. In addition to the expense, the isolation barriers are typically large, which requires a large area on a circuit.

SUMMARY

Data transfer devices and methods for transferring data between first and second circuits are disclosed. A data transfer device includes a first circuit having a plurality of data channels, wherein at least one of the data channels is an active data channel. A serializer has a plurality of inputs and an output, wherein the inputs are coupled to the plurality of data channels. The serializer is for coupling only one active channel at a time to the output. An isolation barrier is coupled to the output of the serializer, the isolation attenuates transients and passes the fundamental frequency associated with the data transfer. A second circuit includes a deserializer having an input and at least one output, the input is coupled to the isolation barrier, the at least one output is at least one active data channel.

DETAILED DESCRIPTION

Figure 1:
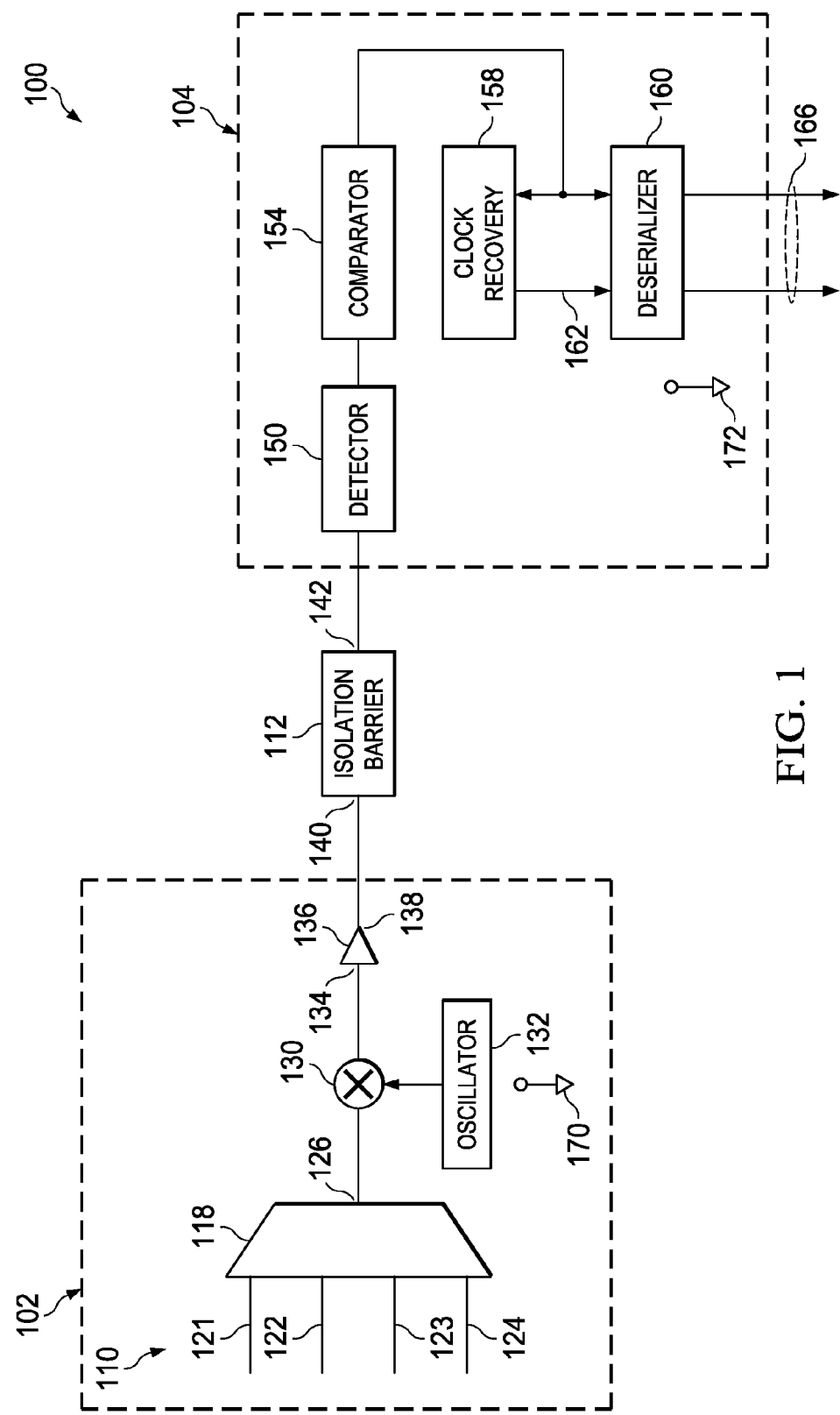
FIG. 1 is a block diagram of an embodiment of a system for transmitting data between two circuits.

FIG. 1 is a block diagram of a system 100 for transmitting data between two circuits that are referred to individually as a first circuit 102 and a second circuit 104. In the embodiment of FIG. 1, the first circuit 102 is referred to as a low voltage circuit and the second circuit is referred to as a high voltage circuit. The first circuit 102, being a low voltage circuit, includes devices that process data and typically operate at low voltages. In some embodiments, the first circuit 102 operates at voltages of approximately 3.3 volts or 5.0 volts. The second circuit 104 typically operates at voltages that are much higher than the voltages in the first circuit 102. In some embodiments, the second circuit 104 is associated with motor controllers that operate at several hundred volts. The voltages of the first and second circuits 102 and 104 described above are exemplary and the first and second circuits 102 and 104 may operate at virtually any voltages.

The system 100 enables data from a plurality of data channels 110 on the first circuit 102 to be transmitted to the second circuit 104. The system 100 serializes the data on the data channels 110 that are active (referred to as active channels), which may not be all the data channels 110. The serialized data is transmitted to the second circuit 104 by way of a barrier 112. The serialized data is then deserialized by the second circuit 104. By only transmitting data on active channels to the second circuit 104, the bandwidth of the transmission is increased and the latency is decreased relative to conventional data transmission techniques.

The first circuit 102 includes a serializer 118 that is coupled to the data channels 110. In some embodiments, the serializer 118 is a multiplexer or includes a multiplexor. In the embodiment of FIG. 1, there are four data channels 110 that are referred to individually as the first data channel 121, the second data channel 122, the third data channel 123, and the fourth data channel 124. In the embodiment of FIG. 1, not all of the data channels 110 are active, meaning that not all of the data channels 110 are configured to transmit data. For example, in some embodiments, the serializer 118 is configured to couple to all of the data channels 110, however, the second circuit 104 uses less than all of the data channels 110. For exemplary purposes, the first and second data channels 121 and 122 are considered to be active data channels meaning that they are configured to transmit data. The third and fourth data channels 123 and 124 are not configured to transmit data and are sometimes referred to as being inactive.

The serializer 118 is configured to couple the data channels 110 to an output 126 one data channel at a time. In the embodiment of FIG. 1, the serializer 118 is configured to only couple the active data channels 121 and 122 to the output 126. Accordingly, circuit resources are not wasted in coupling the inactive data channels 123 and 124 to the output 126. As described in greater detail below, by only coupling the active data channels 121 and 122 to the output 126, the circuit 100 does not waste bandwidth by trying to transmit when the third and fourth data channels 123 and 124 would otherwise be connected to the output 126. In addition, there is no time spent in serializing data on the inactive channels 123 and 124, so latency of the data transfer is improved. In some embodiments, a user or a manufacturer of the circuit 100 programs the serializer 118 to recognize only the active data channels 121 and 122.

The output 126 of the serializer 118 is coupled to a mixer 130 that modulates the data on the channel that is being output by the serializer 118. The mixer 130 receives a mixing signal from an oscillator 132. The frequency of the mixing signal generated by the oscillator 132 is referred to as the fundamental frequency. In some embodiments, the fundamental frequency is 16 GHz. In some embodiments, the mixed signal is referred to as being packetized, meaning that a data packet has been modulated. The data packet can include data received from the active channels 121 and 122, which is stored and transmitted to the mixer 130 after a predetermined period or after the cumulated data has reached a predetermined amount. In some embodiments, the mixed signal is referred to as being a data burst. In the embodiment of FIG. 1, the packetized signal is transmitted to the input 134 of an amplifier 136. The amplified packetized signal is output from the amplifier 136 at an output 138.

The output 138 of the amplifier 136 is coupled to the isolation barrier 112. The isolation barrier has a first node 140 and a second node 142, wherein the packetized signal is input to the isolation barrier 112 at the first node 140 and is output at the second node 142. The isolation barrier 112 attenuates or blocks transients from passing between the first circuit 102 and the second circuit 104. In some embodiments the isolation barrier 112 is a capacitor that attenuates frequencies associated with transients or at least one transient. In the embodiments where the isolation barrier 112 is a capacitor or has a capacitance, the isolation barrier functions as a high pass filter. Accordingly, the fundamental frequency generated by the oscillator 132 should be high enough to be in the pass band of the isolation barrier 112. In other embodiments, the isolation barrier 112 functions as a band pass filter, so the fundamental frequency is in the pass band of the filter. In the embodiments described above, the frequencies associated with transients or at least one transient are below or above the fundamental frequency so that the transients are attenuated without attenuating the packetized data.

The second node 142 of the isolation barrier 112 is coupled to the second circuit 104. The second circuit 104 deserializes the packetized data generated by the first circuit 102. In the embodiment of FIG. 1, the second node 142 is coupled to a detector 150 that detects the packetized signal. In some embodiments, the detector 150 is an envelope detector that filters or attenuates the fundamental frequency and leaves the original data as received on the active data channels. The detector 150 is coupled to a comparator 154 that detects the presence of a data signal. For example, the envelope detector 150 filters out the fundamental frequency, which leaves a data signal or pulse. The comparator 154 determines if the pulse or data signal is in fact a data signal. In some embodiments, the comparator 154 compares the signal to a predetermined voltage. If the amplitude of the data signal is greater than the predetermined voltage, the comparator 154 passes the signal or generates a new signal having a predetermined voltage level. If the amplitude of the signal is less than the predetermined voltage, the comparator does not pass any signal. This situation can be caused by noise or other anomalies picked up by the second circuit 104 wherein the noise or anomalies have amplitudes lower than the predetermined voltage.

The output of the comparator 154 is representative of the data signal that was coupled between an active data channel and the output 126 of the serializer 118. The output signal of the comparator 154 is coupled to two devices, a clock recovery device 158 and a deserializer 160. The clock recovery device 158 recovers or reconstructs the clock signal based on the output signal of the comparator 154. The clock signal is the timing signal used in the generation of the data on the data channels 110. In order to minimize the number of signals passing between the first circuit 102 and the second circuit 104 the clock signal is reconstructed rather than separately sent between the two circuits 102 and 104. If the clock signal was sent between the circuits 102 and 104, another isolation barrier would be required, which is expensive and requires area on the system 100. The clock recovery device 158 detects an edge in the signal from the comparator 154 and commences to reconstruct the clock signal upon the detection.

The reconstructed clock signal is output on a line 162 to the deserializer 160. The reconstructed clock signal is used by the deserializer 160 to reconstruct the data from the comparator 154. For example, the reconstructed clock signal is used by the deserializer to determine when a signal should be sampled. Accordingly, the deserializer 160 is able to function as a conventional deserializer using a conventional clock signal. The deserializer 160 outputs data on the output data channels 166. It is noted that there are only two output data channels 166 because there are only two active data channels 121 and 122 on the data channels 110. There is no data transmitted on the inactive data channels 123 and 124, so there is no need to output data representative of the inactive data channels 123 and 124.

The components and devices on the first circuit 102 operate relative to a first ground 170 and the components and devices on the second circuit 104 operate relative to a second ground 172. The first and second grounds 170 and 172 are isolated from each other and in some embodiments, the second ground 172 electrically floats. Based on the separate grounds 170 and 172, the signals on the first circuit 102 are referenced to the first ground 170 and the signals on the second circuit 104 are referenced to the second ground 172. Some of the above described transients are the result of one of the grounds 170, 172 encountering a voltage spike or the like. In conventional systems, the transients can cause errors in the data transmissions between the two circuits 102, 104. The system 100 packetizes only the active data channels, so it has more bandwidth to transmit data through the barrier 112 using a fundamental frequency that is out of the band of most transients. Accordingly, the system 100 is less susceptible to transients, or has a greater common mode transient immunity (CMTI) than conventional systems.

Having described the components of the system 100, a more detailed description of the operation of the system 100 will now be described. The first circuit 102 receives data signals on the active data channels. In the following exemplary embodiment, the first and second data channels 121 and 122 are active and the second and third data channels 123 and 124 are inactive. The serializer 118 receives the data on the active data channels and serializes the data. In some embodiments, the serializer 118 has a user input wherein the user selects the active data channels. In other embodiments, the first circuit 102 is fabricated with a fewer number of active channels than the number of channels that the serializer 118 can input. In either embodiment, only data on active data channels is serialized. Serializing means inputting data on a plurality of different parallel channels and outputting the data on a single channel. In the example of FIG. 1, the serializer 118 has four channels, but only two channels are active. The serialization is done at a clock rate, which in the example of FIG. 1 is 5 GHz.

The serializer 118 needs to increase the data rate and identify the data, such as identifying from which channel the data originated. For example, if data is received at a rate of 100 MHz on each of the active channels, the data on the output 126 of the serializer 118 has to be increased to a data rate of at least greater than 200 MHz in order to packetize both channels and include preamble data. In order to achieve these functions, the data is packetized at a higher rate, which is the above-described clock rate. In addition, preamble information is added to the data so that the deserializer 160 is able to identify the channel from which the data originated at the serializer 118. As an example, the system 100 may be used in a motor controller wherein data on the first data channel 121 represents a first motor parameter and data on the second data channel 122 represents a second motor parameter. The preamble information identifies on which channel the data was received so that the second circuit 104 is able to process the data appropriately for the motor controller.

Figure 2A:
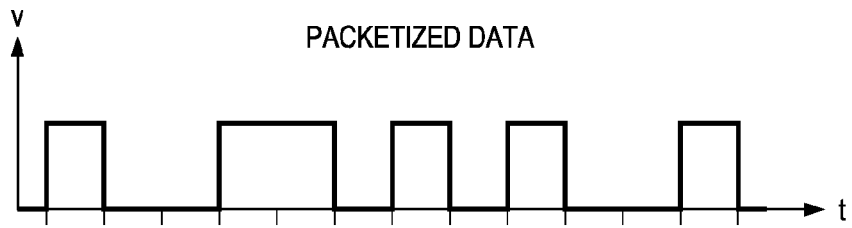
FIG. 2A is an exemplary timing diagram showing an embodiment of a data signal generated by the serializer of FIG. 1.
Figure 2B:
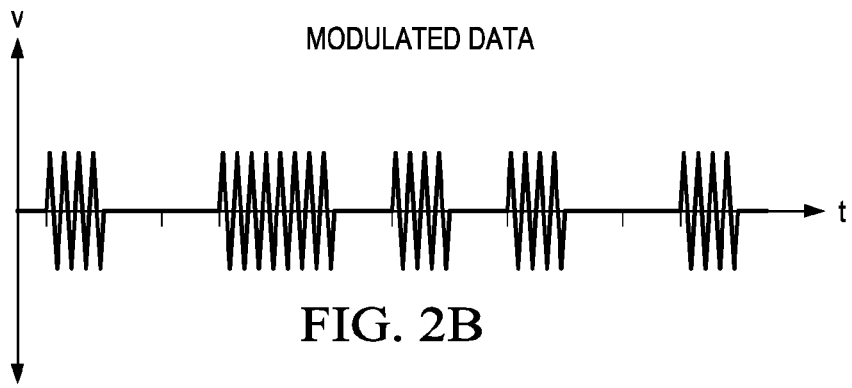
FIG. 2B is an exemplary embodiment of the data signal of FIG. 2A after being modulated by the modulator of FIG. 1.

The output 126 of the serializer 118 is packetized data representing data received from the active channels with the appropriate preambles. The packetized data is modulated with the signal produced by the oscillator 132 using the mixer 130. Reference is made to FIG. 2A, which is an exemplary embodiment of the packetized data generated by the serializer 118. As shown in FIG. 2A, the packetized data consists of pulses wherein the widths of the pulses are determined by the internal clock of the serializer 118. FIG. 2B is an exemplary embodiment of the signal of FIG. 2A after modulation by the mixer 130. In some embodiments, the modulated pulses are referred to as bursts. In other embodiments, a modulated packet is referred to as a burst. The pulses are modulated at a fundamental frequency that enables them to pass through the isolation barrier 112. In some embodiments, the fundamental frequency is greater than the frequency of a transient that may affect the system 100, so that the modulated data can be distinguished from a transient. For example, in some embodiments, the clock rate of the serializer 118 is 5 GHz and the fundamental frequency is 16 GHz.

In some embodiments, the modulated signal of FIG. 2B is amplified by the amplifier 136, FIG. 1. In other embodiments, the signal output by the mixer 130 is strong enough so as not to need amplification. In the embodiment of FIG. 1, the fundamental frequency is high enough to pass the modulated signal through the isolation barrier 112 to the detector 150. As described above, the ground 172 floats, so the AC signal of the fundamental frequency is able to be processed by the detector 150 irrespective of the voltage difference between the first circuit 102 and the second circuit 104.

In some embodiments, the detector 150 is an envelope detector that detects the pulse in the burst or the pulse in the modulated signal. For example, in some embodiments, the detector 150 includes filtering (not shown) that removes the fundamental frequency so that the original pulses similar to those generated by the serializer 118 remain. In some embodiments, the detector 150 is tuned to the fundamental frequency. Accordingly, transients are not detected by the detector 150 because the fundamental frequency is much greater than expected transient frequencies. By isolating the fundamental frequency from the transient frequencies, the common mode transient isolation (CMTI) is improved.

The output of the detector 150 is pulses similar to those generated by the amplifier 136. The pulses, however, may be lower in amplitude than the pulses generated by the amplifier 136, but have amplitudes greater than the predetermined voltage in some embodiments of the comparator 154. As described above, in order to further isolate the signals from noise and transients, the detected signals are compared to the predetermined voltage by the comparator 154. The comparator 154 only passes detected signals having amplitudes greater than the predetermined voltage. In these embodiments, the comparator 154 outputs signals having a predetermined voltage level, so the signals output by the comparator 154 are substantially similar to the signals generated by the serializer 118.

At this point, the data is in the form of packets and needs to separated into individual channels corresponding to the active channels or data associated with the active channels. The signal generated by the comparator 154 is output to both the clock recovery 158 and the deserializer 160. The clock recovery 158 analyzes the signal to determine the clock frequency used by the serializer 118. Referring to FIG. 2A, the clock is shown by the tick marks on the x-axis. The reconstructed clock signal is output on the line 162 to the deserializer 160 where it is used to deserialize the data generated by the comparator 154. The deserializer 160 outputs the data on two channels that correspond to the active channels 121 and 122. In other embodiments, the data is output in serial format with header or preamble information identifying the data and/or the active data channel in which the data was received.

Figure 3:
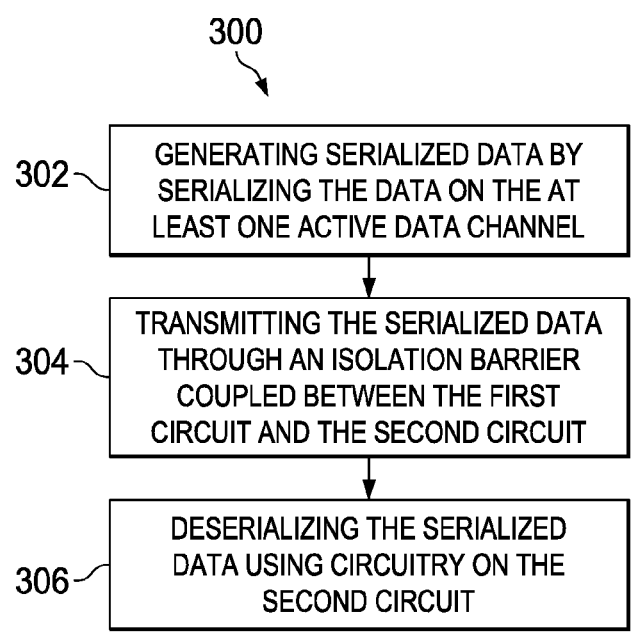
FIG. 3 is a flow chart describing an exemplary embodiment of the operation of the system of FIG. 1.

The operation of the system 100 is described with reference to the flow chart 300 of FIG. 3. In step 302, serialized data is generated by serializing the data on the at least one active data channel. In step 304, the serialized data is transmitted through the isolation barrier 112 that is coupled between the first circuit 102 and the second circuit 104. In step 306 the serialized data is deserialized using circuitry on the second circuit 104.

Although illustrative embodiments have been shown and described by way of example, a wide range of alternative embodiments is possible within the scope of the foregoing disclosure.

What is claimed is:

1. A data transfer system, comprising:
   a first circuit having:
      input data channels configured to receive data for transmission;
      a serializer configured to determine whether each of the input data channels is active or inactive, and the serializer configured to serialize the data in the active input data channel and ignore the inactive input data channel; and
      an output amplifier coupled with the serializer, the output amplifier configured to amplify the serialized data for transmission; and
   a second circuit coupled with the first circuit, the second circuit having a deserializer configured to deserialize the transmitted data.

2. The data transfer system of claim 1, further comprising:
   an isolation barrier coupled between the first circuit and the second circuit, the isolation barrier configured to attenuate a transient in the transmitted data and pass the transmitted data at a fundamental frequency.

3. The data transfer system of claim 2, wherein the isolation barrier includes:
   a band pass filter defining a pass band encompassing the fundamental frequency while excluding a transient frequency of the transient in the transmitted data.

4. The data transfer system of claim 2, wherein the isolation barrier includes:
   a high pass filter defining a frequency threshold below the fundamental frequency and above a transient frequency of the transient in the transmitted data.

5. The data transfer system of claim 1, wherein the first circuit includes:

a mixer coupled with the serializer to receive the serialized data, the mixer configured to convert the serialized data at a fundamental frequency passable by an isolation barrier.

6. The data transfer system of claim 1, wherein the first circuit is configured to operate at a first voltage, and the second circuit is configured to operate at a second voltage higher than the first voltage.

7. The data transfer system of claim 1, wherein the first voltage is below 10 volts, and the second voltage is above 100 volts.

8. The data transfer system of claim 1, wherein the serializer is configured to embed a preamble to the serialized data for indicating the input data channel from which the serialized data is received.

9. A motor system, comprising:
   a motor controller circuit having:
      input data channels configured to receive motor data for transmission;
      a serializer configured to determine whether each of the input data channels is active or inactive, and the serializer configured to serialize the motor data in the active input data channel and ignore the inactive input data channel; and
      an output amplifier coupled with the serializer, the output amplifier configured to amplify the serialized data for transmission; and
   a motor circuit coupled with the motor controller circuit, the motor circuit having a deserializer configured to deserialize the transmitted data.

10. The motor system of claim 9, further comprising:
    an isolation barrier coupled between the first circuit and the second circuit, the isolation barrier configured to attenuate a transient in the transmitted data and pass the transmitted data at a fundamental frequency.

11. The motor system of claim 10, wherein the isolation barrier includes:
    a band pass filter defining a pass band encompassing the fundamental frequency while excluding a transient frequency of the transient in the transmitted data.

12. The motor system of claim 10, wherein the isolation barrier includes:
    a high pass filter defining a frequency threshold below the fundamental frequency and above a transient frequency of the transient in the transmitted data.

13. The motor system of claim 9, wherein the motor controller circuit includes:
    a mixer coupled with the serializer to receive the serialized data, the mixer configured to convert the serialized data at a fundamental frequency passable by an isolation barrier.

14. The motor system of claim 9, wherein the serializer is configured to embed a preamble to the serialized data for indicating the input data channel from which the serialized data is received.

15. A low voltage circuit configured to communicate with a high voltage circuit, the low voltage circuit comprising:
    input data channels configured to receive data for transmission;
    a serializer configured to determine whether each of the input data channels is active or inactive, and the serializer configured to serialize the data in the active input data channel and ignore the inactive input data channel; and
    an output amplifier coupled with the serializer, the output amplifier configured to amplify the serialized data for transmission.

16. The low voltage circuit of claim 15, further comprising:
    an isolation barrier configured to attenuate a transient in the transmitted data and pass the transmitted data transmitted at a fundamental frequency.

17. The low voltage circuit of claim 15, wherein the isolation barrier includes:
    a band pass filter defining a pass band encompassing the fundamental frequency while excluding a transient frequency of the transient in the transmitted data.

18. The low voltage circuit of claim 17, wherein the isolation barrier includes:
    a high pass filter defining a frequency threshold below the fundamental frequency and above a transient frequency of the transient in the transmitted data.

19. The low voltage circuit of claim 15, further comprising:
    a mixer coupled with the serializer to receive the serialized data, the mixer configured to convert the serialized data at a fundamental frequency passable by an isolation barrier.

20. The low voltage circuit of claim 15, wherein the serializer is configured to embed a preamble to the serialized data for indicating the input data channel from which the serialized data is received.

* * * * *